United States Patent
Chengalva

[11] Patent Number: 5,925,828
[45] Date of Patent: Jul. 20, 1999

[54] LOW COST CLEARANCE GAUGE AND METHOD OF USING SAME

[75] Inventor: Mahesh K. Chengalva, Kokomo, Ind.

[73] Assignee: Delco Electronics Corp., Kokomo, Ind.

[21] Appl. No.: 08/946,932

[22] Filed: Oct. 8, 1997

Related U.S. Application Data

[51] Int. Cl.⁶ .................................................. G01N 3/00
[52] U.S. Cl. ............................. 73/821; 73/432.1; 33/517
[58] Field of Search ................ 73/862.451, 862.49, 73/432.1, 818, 821; 33/517

[56] References Cited

U.S. PATENT DOCUMENTS

| | | | |
|---|---|---|---|
| 4,229,884 | 10/1980 | Knoll et al. ................................ | 33/556 |
| 4,694,585 | 9/1987 | Frizot et al. ............................... | 33/502 |
| 4,806,848 | 2/1989 | Demers .................................... | 324/662 |
| 5,497,559 | 3/1996 | Okumura et al. ......................... | 33/517 |
| 5,597,965 | 1/1997 | Endo et al. ........................... | 73/862.49 |

*Primary Examiner*—Max H. Noori
*Attorney, Agent, or Firm*—Jimmy L. Funke

[57] ABSTRACT

A clearance gauge comprises a thin foil rolled into a tubular coil at one end and having a flat tab extending from the coil, the coil windings being secured by a layer of adhesive. The gauge is attached via the tab to one of a pair of relatively movable parts and is deformed by compression between the parts to assume a dimension equal to the clearance between the parts. The foil has a low yield strength so that the coil substantially retains the dimension for later measurement to thereby afford a measure of the clearance.

11 Claims, 2 Drawing Sheets

LOW COST CLEARANCE GAUGE AND METHOD OF USING SAME

FIELD OF THE INVENTION

This invention relates to the determination of clearance or contact between relatively movable parts and particularly to a method and apparatus for detecting or measuring such clearance.

BACKGROUND OF THE INVENTION

In many industrial applications relatively movable parts may closely approach one another or make undesirable contact in inaccessible places where direct observation is not possible. Still it is desirable to determine whether and where such contact or small clearances occur so that suitable adjustments may be made to the apparatus or process. Detection of a small clearance between parts is important in preventing contact since in many cases additional wear of an apparatus may lead to actual contact. It is thus advantageous to inexpensively measure the clearance between parts at one or several locations.

One example of where clearance measurement is necessary is in the testing of circuit boards carrying electrical components. Test probes engage one side of the circuit board while a fixture presses against the other side. If not properly adjusted, the fixture may bear against components or a force unbalance may flex the board, causing damage. Measuring the clearance will allow determination of whether fixture adjustment or redesign is necessary.

SUMMARY OF THE INVENTION

It is therefore an object of the invention to measure the amount of clearance or detect contact in inaccessible regions of relatively movable parts. Another object is to perform such measurements inexpensively. An additional object is the fabrication of an inexpensive one-time gauge for measuring clearance.

A clearance gauge comprises a thin foil of easily deformable material which is wound in a tubular coil and secured by a very thin layer of adhesive. The outer end of the foil extends from the coil to serve as a mounting tab or a separate tab is attached to the coil. The foil is preferable made of inexpensive material such as aluminum but must have a low yield strength. Only a few foil windings comprise the coil which defines a central air space so that the coil is easily deformed when pressure is applied. Where the coil is very fragile (and thus sensitive to low forces) the tab serves as a handle to prevent coil damage due to handling prior to and during mounting.

The gauge is mounted to a surface of one part where contact with a second part it is expected to be likely. During operation of the machine or process incorporating the parts the second part may bear against the gauge to permanently deform the coil to the extent of the clearance between the parts. After the operation, the gauge is examined to determine whether it has been deformed and the resulting thickness of the coil is measured to establish the amount of clearance.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Although the ensuing description is directed to a fragile clearance gauge and its use in measurement of electronic circuit applications where very small forces may be experienced, the gauge may in principle be robust and suitably sized for applications where large forces are experienced.

Figure 1:
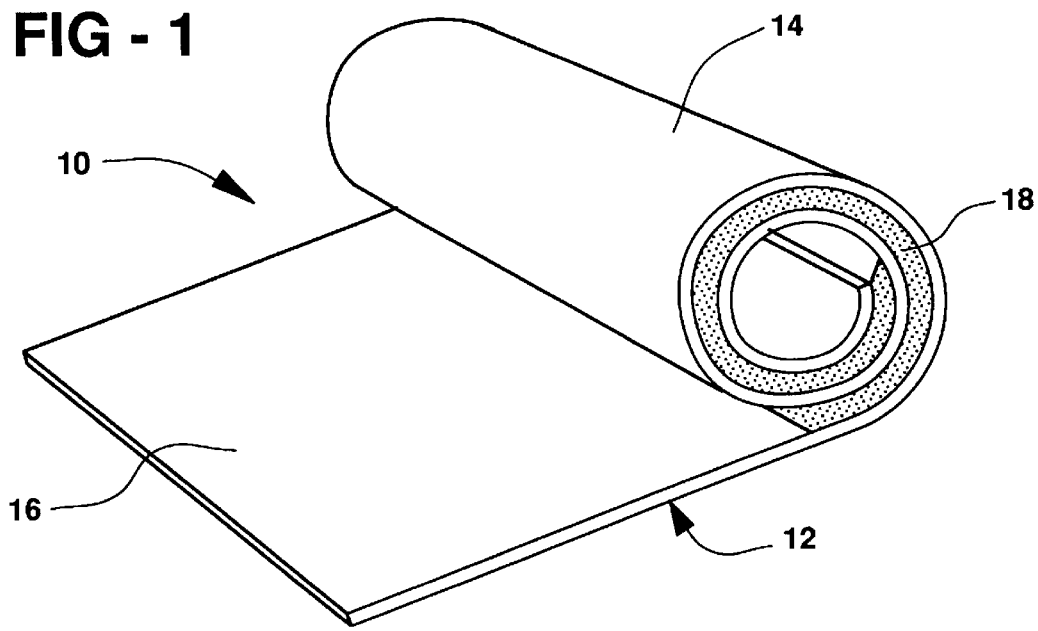
FIG. 1 is an isometric view of a clearance gauge according to the invention.
Figure 2:
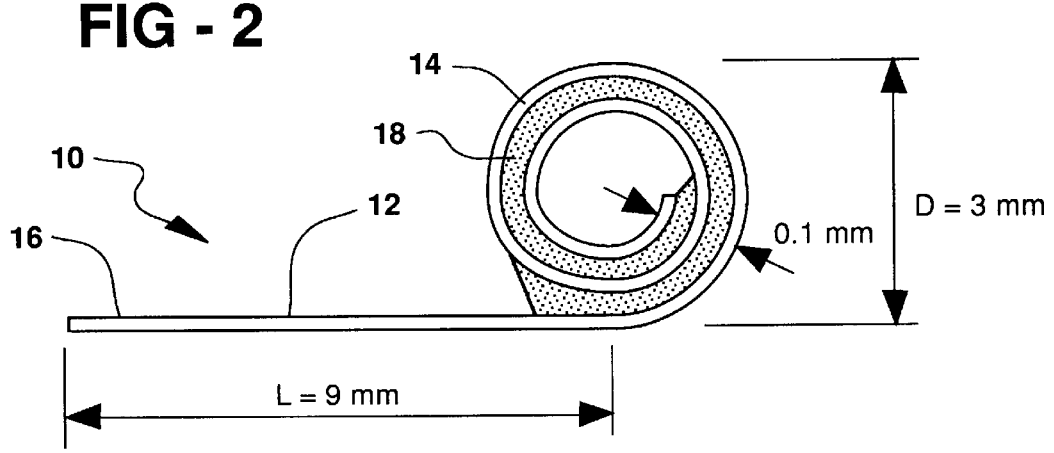
FIG. 2 is a side view of the gauge of FIG. 1.

Referring to FIGS. 1 and 2, a clearance gauge 10 comprises a sheet of thin foil 12 rolled at one end into a tubular coil 14 defining a central opening, the opposite end being flat to form a tab 16 for mounting and handling. Alternatively, the tab can be formed of another material and attached to the coil. The coil comprises only a few turns or layers held together by a thin film of adhesive 18. The foil material must have a low yield strength so that when it is deformed by compression between adjacent parts it will remain in its deformed state.

Figure 3:
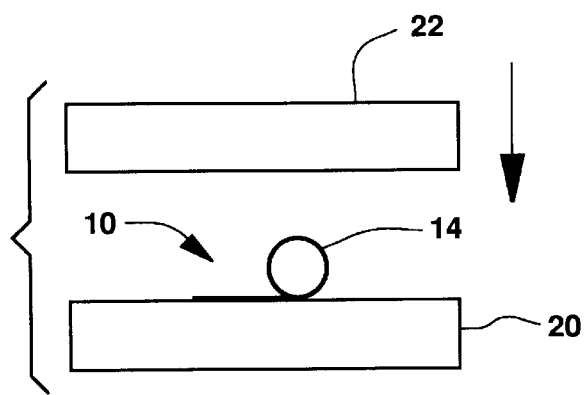
FIGS. 3–5 are schematic view of a clearance gauge mounted for clearance measurement before, during, and after parts operation, respectively.
Figure 4:
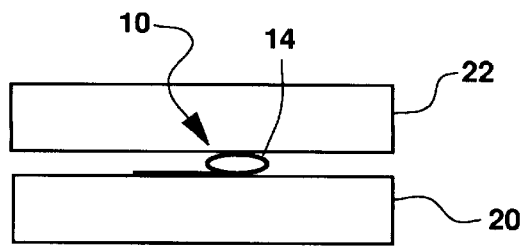
Figure 5:
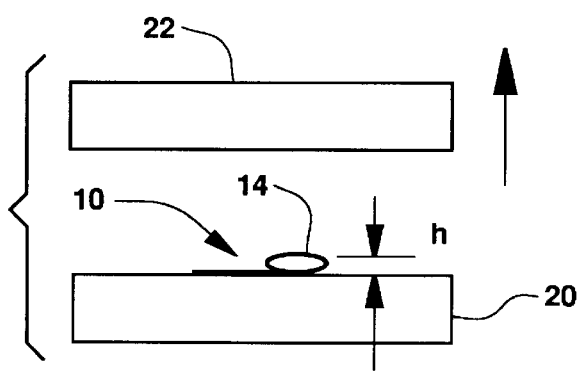

As shown in FIG. 3 the gauge 10 is secured to the surface of one part 20 by adhesive or tape applied to the tab 16. Then a second part 22 is moved toward the first part 20 in accordance with the normal operation of an apparatus or a process to compress the gauge between the parts (FIG. 4) and then the deformed coil is later observed to detect the deformation or the height h of the coil is measured (FIG. 5) to determine the clearance between the parts. The two relatively movable parts 20, 22 represent parts of an apparatus or members moved during a process and which potentially may make contact.

A preferred gauge is made of aluminum foil 25 microns thick and about 6 mm wide coiled with 2 or 3 turns and held by a very thin layer of a soft epoxy adhesive. As indicated in FIG. 2 the coil has a diameter of 3 mm and a wall thickness of 0.1 mm. The tab length is 9 mm. A force of 60 to 80 grams is sufficient to collapse the coil. a gauge of this size is fragile and can be damaged by handling so that to avoid damage the gauge is gripped by the tab 16 when assembling the gauge to a part.

The aluminum foil has a yield stress of 4000 psi. This material will readily deform when compressed but will experience some recovery or "spring back" when the compression force is removed. Where accurate clearance measurement is desired the measured height may be reduced by an empirically determined factor to compensate for the spring back. Other softer materials such as tin or gold can be used instead of aluminum so that the spring back, if any, would be negligible. The material may be either metal or non-metal. The type of adhesive used is not important so long as it doesn't unduly affect the coil properties.

Figure 6:
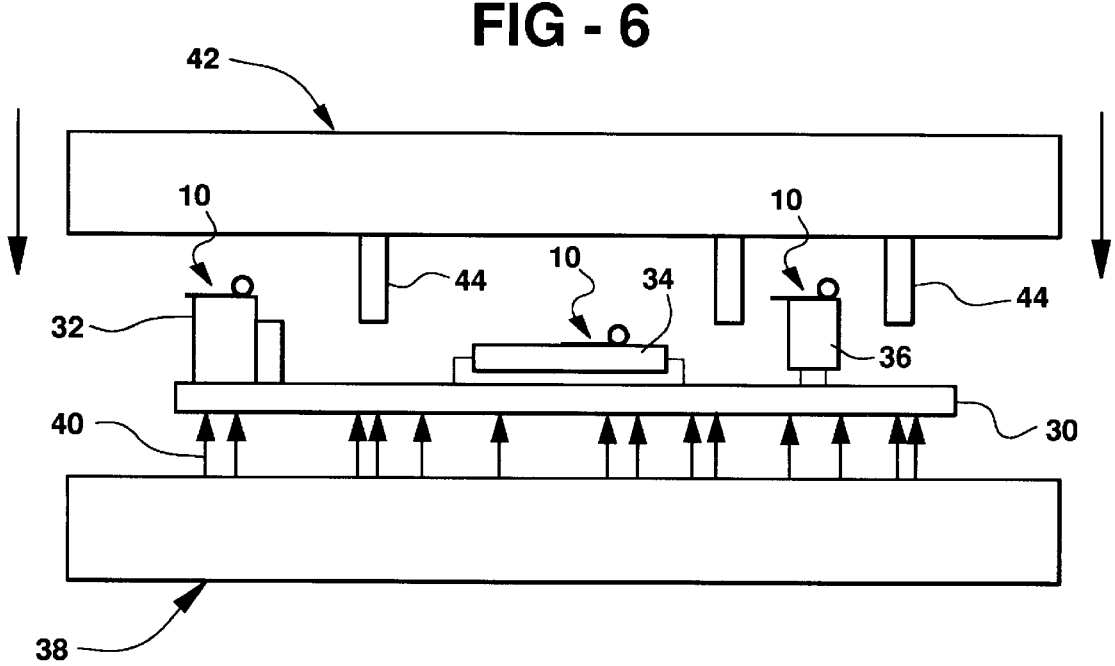
FIG. 6 is a side view of a circuit board test apparatus with clearance gauges installed, according to the invention.

Application of a clearance gauge to a circuit board testing apparatus is illustrated in FIG. 6. A circuit board 30 supports on its top surface several components including a connector header 32, an integrated circuit 34 and a capacitor 36. The test apparatus includes a base 38 has a plurality of electrical probes 40 which contact circuits on the lower surface of the board 30 and an upper fixture 42 which has push-down pins 44 to press the circuit board against the probes 40. It is important that the upper fixture not contact the components 32–26 during the test, else the components may be damaged. A test for proper clearance is carried out by placing a gauge 10 on each component 32–36 and then running the electrical test. The condition of the gauges after the test reveals the degree of clearance between the upper fixture and each component. If the gauge deformation shows contact with a component or even a very small clearance, an adjustment should be made in the push-down pins to increase the clearance to a safe value.

It will thus be seen that the clearance gauge is sufficiently inexpensive that it may be discarded after one use, although if no deformation occurs a gauge may be salvaged for another use. Further the gauges are easy to use to obtain clearance measurements in regions which are inaccessible or not visible during operation.

The embodiments of the invention in which an exclusive property or privilege is claimed are defined as follows:

1. A gauge for recording clearance between relatively movable parts comprising:

a tubular coil of sheet material selected from materials of low yield strength; and means for mounting the coil to a surface of one of the parts;

whereby the coil is subject to permanent deformation to a dimension substantially equal to the clearance when compressed between the movable parts.

2. The gauge as defined in claim 1 wherein the coil comprises a plurality of windings of the sheet material.

3. The gauge as defined in claim 1 wherein the coil comprises a plurality of windings of the sheet material secured by a layer of adhesive between the windings.

4. The gauge as defined in claim 1 wherein:

the coil comprises a plurality of windings of the sheet material secured by a layer of adhesive between the windings; and the means for mounting the coil comprises a tab attached to the coil for mounting on a part surface.

5. The gauge as defined in claim 1 wherein the means for mounting the coil comprises an extension of the sheet material beyond the coil.

6. The gauge as defined in claim 1 wherein:

the sheet material has a thickness on the order of 25 microns; and the coil has a diameter on the order of 3 mm.

7. The gauge as defined in claim 1 wherein:

the coil has a diameter less than one centimeter; and the sheet material thickness and the number of windings is sufficient for structural integrity of the gauge prior to and during installation on the part surface.

8. A method of measuring clearance between movable parts comprising the steps of:

forming a tubular coil of a foil having low yield strength;

mounting the coil on a surface of one of the parts;

permanently deforming the coil by moving the parts through an operating range whereby the coil is deformed by compression between the parts; and then determining the clearance by inspecting the coil.

9. The method as defined in claim 8 wherein:

the deforming step reduces the thickness of the coil to a value equal to the clearance; and the step of inspecting the coil comprises measuring the thickness of the coil.

10. The method as defined in claim 8 wherein:

the step of forming a tubular coil includes winding the foil in a plurality of layers and adhesively joining the layers.

11. The method as defined in claim 8 wherein:

the step of forming a tubular coil includes winding a portion of the foil in layers and leaving another portion of the foil as a mounting tab; and the step of mounting the coil comprises adhering the mounting tab to the surface of the said one of the parts.

* * * * *